July 31, 1951 O. GRIMM 2,562,665

MOVEMENT CONTROL DEVICE FOR MAGNETIC SOUND HEADS ON SOUND RECORDING AND SOUND REPRODUCING MACHINES

Filed Feb. 27, 1948

Inventor
Oskar Grimm
By Singer, Ehlert, Stern & Carlberg
Attys

Patented July 31, 1951 2,562,665

UNITED STATES PATENT OFFICE 2,562,665

MOVEMENT CONTROL DEVICE FOR MAGNETIC SOUND HEADS ON SOUND RECORDING AND SOUND REPRODUCING MACHINES

Oskar Grimm, Kusnacht, Switzerland, assignor to Daphne Investment Trust, Vaduz, Principality of Liechtenstein Application February 27, 1948, Serial No. 11,521
In Switzerland December 23, 1947

7 Claims. (Cl. 274—13)

The invention relates to a device for controlling the movement of magnetic sound heads of talking machines employing disc shaped sound carriers. In all sound reproducing machines it is desirable to restore the sound head quickly to its initial position to be ready for another reproduction for which purpose the start of the wholly or partly reproduced sound track on the carriers has to be returned to be in juxtaposition with the sound head.

The present invention offers a principal solution of this problem, and it is an object of the invention to provide a guide disc for the sound head, which guide disc is biased by a tensioned spiral spring adapted to return the guide disc and therewith the sound carrier to initial position. The guide disc is driven by an intermediate shaft provided with a clutch which shaft is driven with predetermined speed ratio with respect to the sound carrier disc.

In the accompanying drawing a preferred form of embodiment of the invention is schematically represented by way of example:

Figure 1:
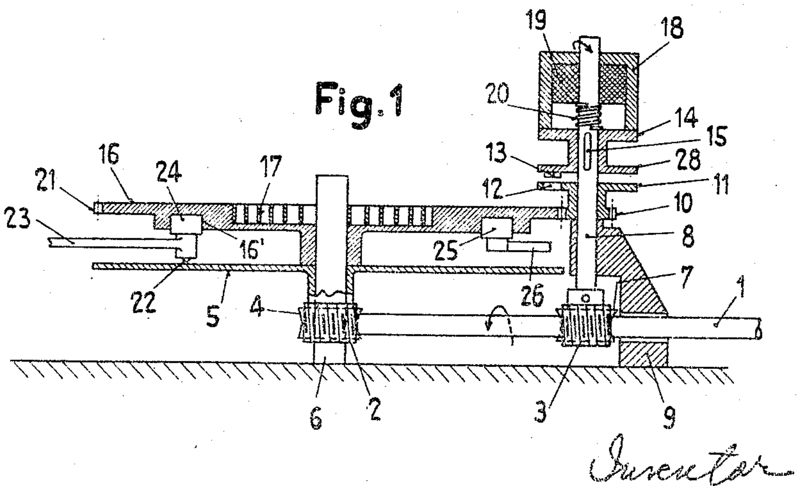
Fig. 1 is a cross section view of the control device.

In Fig. 1, 1 denotes the drive shaft on which two worms 2 and 3 are rigidly secured. The worm 2 transmits the rotary movement of the shaft 1 to a worm wheel 4 which is rigidly connected with the sound disc 5 and is rotatably journalled on the pivot pin 6. The other worm 3 drives a worm wheel 7 which is fixed to an intermediate shaft 8. The latter is rotatably journalled in a stationary support 9.

A pinion 10 which is integrally formed with the lower clutch disc 11 is freely rotatably mounted on the shaft 8. The said cultch disc 11 has a hole 12 near its outer circumference. The upper clutch disc 28 carries a driving pin 13 which is adapted to engage the hole 12 in the lower clutch disc 11. This upper clutch disc 28 is axially shiftable on the shaft 8 with a magnet armature plate 14 which is integrally formed with the clutch disc 28. A key 15 transmits the rotational movement of the shaft 8 to the clutch disc 28. When the driving pin 13 enters hole 12 in the clutch disc 11, the rotatory movement of the latter is transmitted via the pinion 10 to the guide disc 16 which is provided on its lower face with a spiral groove 16′. During this rotation of the guide disc 16 the tension of a spiral spring 17 is increased, because this spring is attached with one end to the stationary pivot pin 6, and with its other end to the guide disc 16. The worm gearing 3, 7 is self-locking so that the spring 17 cannot act back on the shaft 1.

An electromagnet having a coil 19, and which is employed for the operation of the clutch, is attached to a bracket (not shown). The top wall of the magnet casing 18 serves as a bearing for the upper end of the shaft 8. A compression spring 20 on the shaft 8 and arranged between the coil 19 and the armature plate 14 tends to move the latter with the upper clutch plate 28 off the lower end of magnet casing 18, so that the driving pin 13 comes to bear on the lower clutch disc 11. If now the shaft 8 rotates, the pinion 10 will be driven by the lower clutch plate as soon as driving pin 13 has entered the hole 12 in the lower clutch disc 11.

As will be seen, the transmission ratio between the sound carrier disc 5 and the shaft 8 is equal to 1:1, i. e. when the sound carrier disc makes one revolution, this applies also to the shaft 8. By this reason, in the form of embodiment shown, there is only one possibility of engagement available to the clutch members 11, 12, 13 and 14.

The aforesaid transmission ratio can, however, naturally be selected as desired, provided it is a whole figure ratio such as 1:1, 2:1, 3:1, 4:1 etc. Accordingly the clutch may have one, two, three, four or more definite points of engagement, so that at each revolution of the sound carrier 5 one point of engagement is available.

The pinion 10 meshes with gear teeth 21 on the circumference of the guide disc 16 and the transmission ratio from pinion 10 to the gear formed by the gear teeth ring 21 on the guide disc 16 has been chosen in this embodiment to be 10:1. Here, too, the transmission ratio can be selected as desired, but is not confined to a whole number ratio. Accordingly any desired transmission ratio from the sound carrier disc 5 to the guide disc 16 is permissible, with any desired gradient of the spiral groove 16′.

Figure 2:
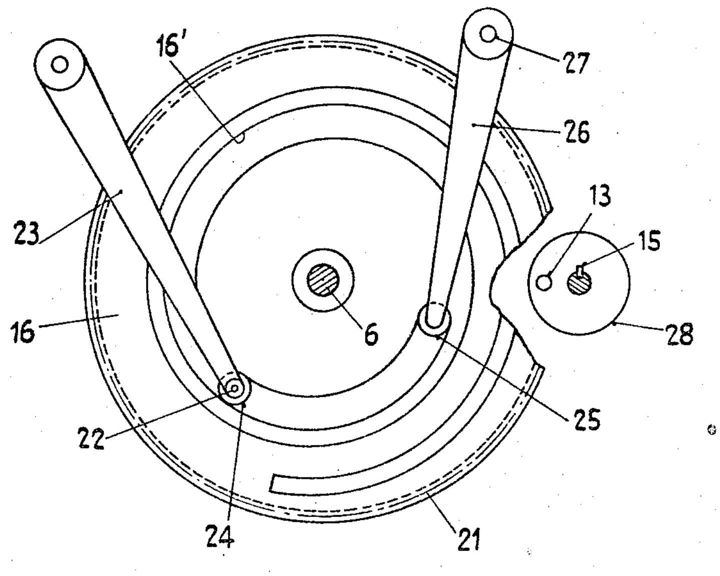
Fig. 2 shows the guide disc with a spiral track as viewed from below, as also shows an end view of the upper half of the clutch.

For the guidance of the sound head 22, which is fixed to the pivoted lever 23, serves a guide pin 24 which is attached to the same lever, and extends upwardly therefrom into the spiral groove 16′ so that the radial movement of the pin and therewith the sound head is directed by the spiral groove 16′ as will be seen from Fig. 2. The guide disc 16 is always returned to the same initial position which is determined by an abutment pin 25, which is attached to a lever 26 pivoted about a fixed pivot pin 27 (Fig. 2). The abutment pin 25 extends also into the spiral groove 16′ and in the initial or starting position of the guide disc 16 the pin 25 engages the end wall at the inner end of the groove 16'.

The operation of the device is as follows:

The drive shaft 1 of the sound carrier disc 5 drives also the intermediate shaft 8 which latter by means of the clutch 11, 28 transmits a corresponding rotation to the spiral groove disc 16. This guide disc 16 has, under the action of the spring 17, the tendency of returning to its initial position determined by the inner end of the groove 16' and the pin 25. The number of possibilities of engagement of the magnetically controlled clutch on the aforesaid intermediate shaft 8 corresponds to the number of revolutions which the sound carrier disc performs during one revolution of the intermediate shaft 8. The sound head 22 is, as stated, attached to the pivoted lever 23 on which also the pin 24 is attached which extends into the spiral groove 16' in the guide disc 16 which latter is mounted in axial alinement with the sound carrier disc 5.

The clutch upon energization of the coil 19 is disengaged and allows the guide disc 16 to return very rapidly to its initial position and the magnetic sound head 22 at the same time is returned positively to its initial position in a radial direction by moving swiftly over the smooth surface of the sound carrier disc. If now the clutch is engaged by de-energizing its coil 19, the guide disc is only rotated after the start of the recorded sound track on the sound carrier 5 has been moved to a position under the magnetic sound head 22.

When recording on the sound carrier disc 5, the clutch is caused to be engaged so that the drive of the disc 16 is effected through the shaft 1, intermediate shaft 8, key 15, clutch disc 28, pin 13, hole 12, disc 11 and pinion 10 which meshes with the gear teeth 21. Upon rotation of the guide disc 16, the sound head 22 moves gradually from the central portion of the sound carrier disc 5 to the outer portion thereof according to the pitch of the guide spiral 16. If the recorded sounds are now to be reproduced, the clutch between the discs 28 and 11 is disengaged by an energization of the electromagnet so as to move the clutch disc 28 upwardly against the action of the spring 20, so that the spring 17 can turn the guide disc 16 back until the stop 25 prevents any further rotation. This action takes place very quickly. Thereafter the clutching of the discs 11, 28 is again reestablished, which is possible, as stated above, in one predetermined position only, so that the sound head comes to lie on the sound track with absolute certainty.

What I claim as my invention and desire to secure by Letters Patent, is:

1. In a sound recording and sound reproducing device, the combination of a rotary disc-shaped magnetic sound carrier rotatably mounted on a stationary pivot pin, a drive shaft for rotating said sound carrier, a rotary guide disc having a spiral guide groove therein arranged in spaced coaxial relation with said sound carrier, means forming a driving connection between said rotary guide disc and said drive shaft, a magnetic sound head mounted on a lever which latter is pivotally supported about an axis outside the circumference of said sound carrier so as to move the sound head in a substantially radial direction over the sound carrier, said magnetic sound head being arranged in the space between said guide disc and said sound carrier in a manner to slidably engage the surface of the latter, while a guide pin on said lever projects into the guide groove in said guide disc, a clutch in the driving connection between said drive shaft and said rotary guide disc, means for disengaging said clutch, a spring connected with one end to said guide disc and with its other end to said stationary pivot pin, said spring being put under increased tension when said guide disc is rotated by said driving connection and upon disengagement of said clutch returning said guide disc to its starting position, and an abutment pin extending into said guide groove to engage one end wall of said guide groove and to stop the return movement of said guide disc when the latter has reached its starting position.

2. In a sound recording and sound reproducing device, the combination of a rotary disc-shaped magnetic sound carrier rotatably mounted on a stationary pivot pin, a drive shaft for rotating said sound carrier, a rotary guide disc having a spiral guide groove therein arranged in spaced coaxial relation with said sound carrier, an intermediate shaft geared to said drive shaft, gear teeth on said rotary guide disc, a pinion meshing with said gear teeth and freely rotatably mounted on said intermediate shaft, a clutch comprising a clutch disc axially slidably mounted on said intermediate shaft and another clutch disc fixed to said pinion to rotate the latter when said two clutch discs are in engageemnt with each other, a magnetic sound head mounted on a lever which latter is pivotally supported about an axis outside the circumference of said sound carrier, said magnetic sound head being arranged in the space between said guide disc and said sound carrier in a manner to slidably engage the surface of the latter, while a guide pin on said lever projects into the guide groove in said guide disc, a spring connected with one end to said guide disc and with its other end to said stationary pivot pin, said spring being put under increased tension when said guide disc is rotated by said pinion on said intermediate shaft when the latter is driven by the drive shaft and said clutch discs are in engagement with each other, said spring upon disengagement of said clutch returning said guide disc to its starting position, and an abutment pin extending into said guide groove to engage one end wall of said guide groove and to stop the return movement of said guide disc when the latter has reached its starting position.

3. In a sound recording and sound reproducing device, the combination of a rotary disc-shaped magnetic sound carrier rotatably mounted on a stationary pivot pin, a drive shaft for rotating said sound carrier, a rotary guide disc having a spiral guide groove therein arranged in spaced coaxial relation with said sound carrier, an intermediate shaft geared to said drive shaft, gear teeth on said rotary guide disc, a pinion meshing with said gear teeth and freely rotatably mounted on said intermediate shaft, a clutch comprising a clutch disc axially slidably mounted on said intermediate shaft and another clutch disc fixed to said pinion to rotate the latter when said two clutch discs are in engagement with each other, the transmission ratio of said pinion and gear teeth on said guide disc being such that said rotary guide disc is driven by said intermediate shaft with a speed which is a fraction of the speed with which the magnetic sound carrier disc is driven by said drive shaft, a magnetic sound head mounted on a lever which latter is pivotally supported about an axis outside the circumference of said sound carrier, said magnetic sound head being arranged in the space between said guide disc and said sound carrier in a manner to slidably engage the surface of the latter, while a guide pin on said lever projects into the guide groove in said guide disc, a spring connected with one end to said guide disc and with its other end to said stationary pivot pin, said spring being put under increased tension when said guide disc is rotated by said pinion on said intermediate shaft when the latter is driven by the drive shaft and said clutch discs are in engagement with each other, said spring upon disengagement of said clutch returning said guide disc to its starting position, and an abutment pin extending into said guide groove to engage one end wall of said guide groove and to stop the return movement of said guide disc when the latter has reached its starting position.

4. In a sound recording and sound reproducing device according to claim 2, the employment of a pressure spring acting on said axially slidable clutch disc for manually urging it into engagement with the other clutch disc in a predetermined position of said sound carrier, and electromagnetic means having a movable armature fixed to said slidable clutch disc and effective, when energized, to disengage said clutch against the action of said pressure spring.

5. In a sound recording and sound reproducing device, the combination of a rotary disc-shaped magnetic sound carrier rotatably mounted on a stationary pivot pin, a drive shaft for rotating said sound carrier, a rotary guide disc having a spiral guide groove therein arranged in spaced coaxial relation with said sound carrier, an intermediate shaft geared to said drive shaft, gear teeth on said rotary guide disc, a pinion meshing with said gear teeth and freely rotatably mounted on said intermediate shaft, a clutch comprising a clutch disc axially slidably mounted on said intermediate shaft and another clutch disc fixed to said pinion to rotate the latter when said two clutch discs are in engagement with each other, cooperative means on said clutch discs for causing the establishment of a positive driving connection between said clutch discs at only one predetermined relative rotative position between the same at which the sound head is positioned at the start of the sound track on said sound carrier, a magnetic sound head mounted on a lever which latter is pivotally supported about an axis outside the circumference of said sound carrier, said magnetic sound head being arranged in the space between said guide disc and said sound carrier in a manner to slidably engage the surface of the latter, while a guide pin on said lever projects into the guide groove in said guide disc, a spring connected with one end to said guide disc and with its other end to said stationary pivot pin, said spring being put under increased tension when said guide disc is rotated by said pinion on said intermediate shaft when the latter is driven by the drive shaft and said clutch discs are in engagement with each other, said spring upon disengagement of said clutch returning said guide disc to its starting position, and an abutment pin extending into said guide groove to engage one end wall of said guide groove and to stop the return movement of said guide disc when the latter has reached its starting position.

6. In a sound recording and sound reproducing device according to claim 2, in which the transmission ratio of said pinion and gear teeth on said guide disc is such that said rotary guide disc is driven by said intermediate shaft with a speed which is a fraction of the speed with which the magnetic sound carrier disc is driven by said drive shaft, and including cooperative means on said clutch discs for causing the establishment of a positive driving connection between said clutch discs at only one predetermined relative rotative position between the same at which the sound head is positioned at the start of the sound track on said sound carrier.

7. In a sound recording and sound reproducing device, the combination of a rotary disc-shaped magnetic sound carrier rotatably mounted on a stationary pivot pin, a drive shaft for rotating said sound carrier, a rotary guide disc having a spiral guide groove therein arranged in spaced coaxial relation with said sound carrier, the inner end of said groove terminating in an end wall forming an abutment, means forming a driving connection between said rotary guide disc and said drive shaft, a magnetic sound head mounted on a lever which latter is pivotally supported about an axis outside the circumference of said sound carrier so as to move the sound head in a substantially radial direction over the sound carrier, said magnetic sound head being arranged in the space between said guide disc and said sound carrier in a manner to slidably engage the surface of the latter, while a guide pin on said lever projects into the guide groove in said guide disc, a clutch in the driving connection between said drive shaft and said rotary guide disc, a pressure spring for normally engaging said clutch, electromagnetic means for disengaging said clutch, a spring connected with one end to said guide disc and with its other end to said stationary pivot pin, said spring being put under increased tension when said guide disc is rotated by said driving connection and upon disengagement of said clutch returning said guide disc to its starting position, and an abutment pin extending into said guide groove to engage said end wall of said guide groove and to stop the return movement of said guide disc when the latter has reached its starting position.

OSKAR GRIMM.

REFERENCES CITED

The following references are of record in the file of this patent:

UNITED STATES PATENTS

| Number | Name | Date |
|---|---|---|
| 1,269,607 | Ivatts | June 18, 1918 |
| 1,638,424 | Webb | Aug. 9, 1927 |
| 1,852,456 | Frits | Apr. 5, 1932 |
| 2,005,588 | Mallina | June 18, 1935 |
| 2,314,345 | Cartella | Mar. 23, 1943 |